Figure 1:
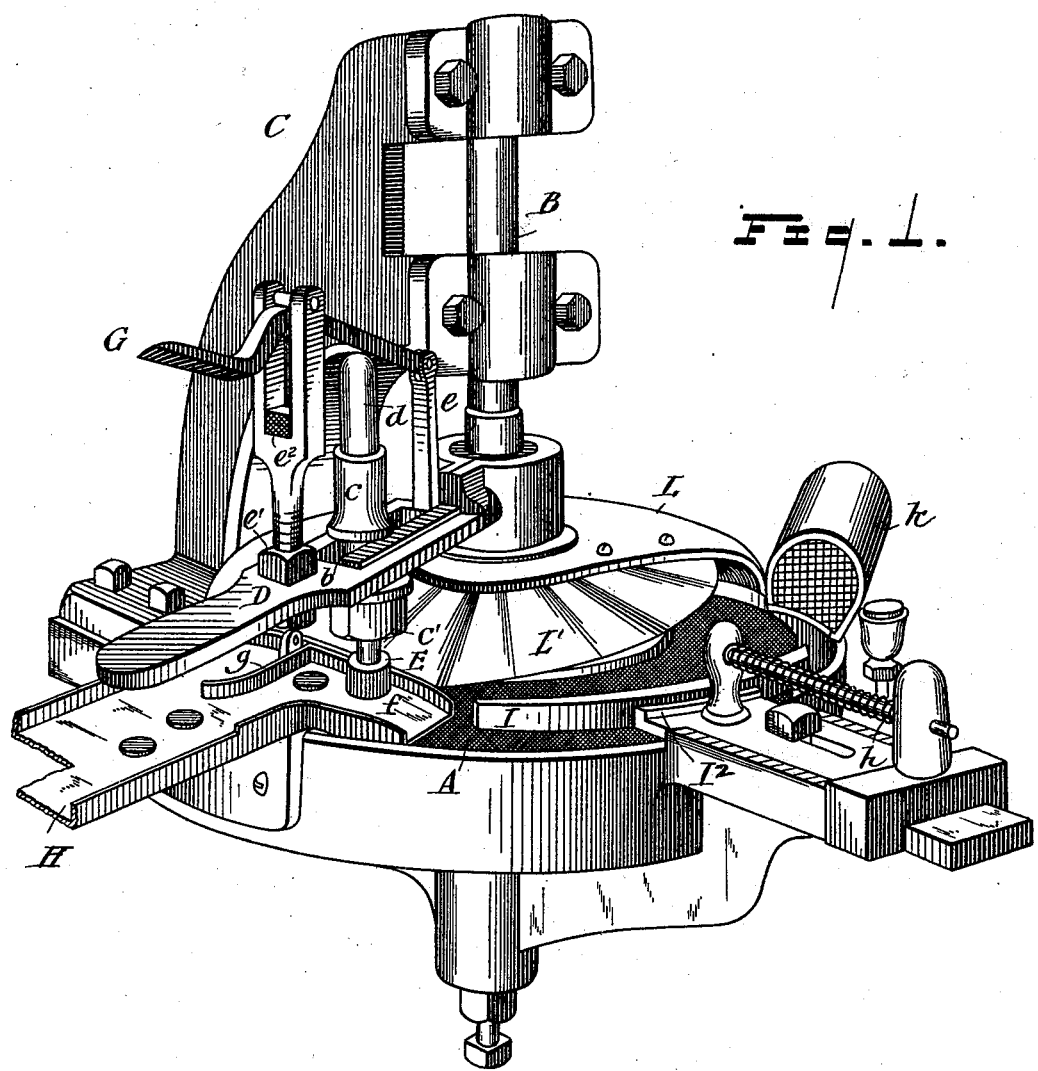

(No Model.) 4 Sheets—Sheet 1.

G. CARLYLE.
APPARATUS FOR FORMING PEARL BUTTONS.

No. 522,044. Patented June 26, 1894.

WITNESSES

INVENTOR

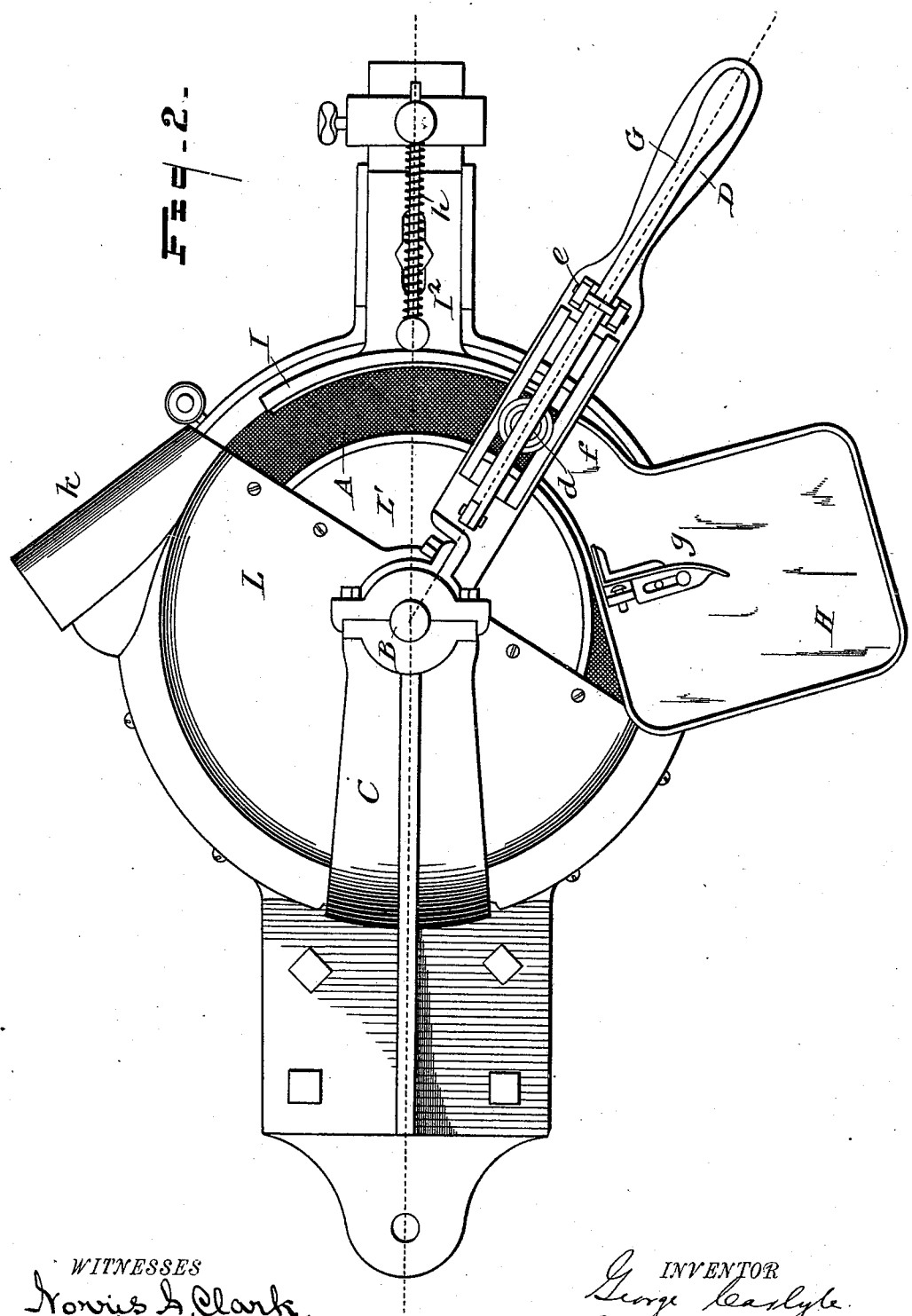

(No Model.) 4 Sheets—Sheet 3.
G. CARLYLE.
APPARATUS FOR FORMING PEARL BUTTONS.
No. 522,044. Patented June 26, 1894.
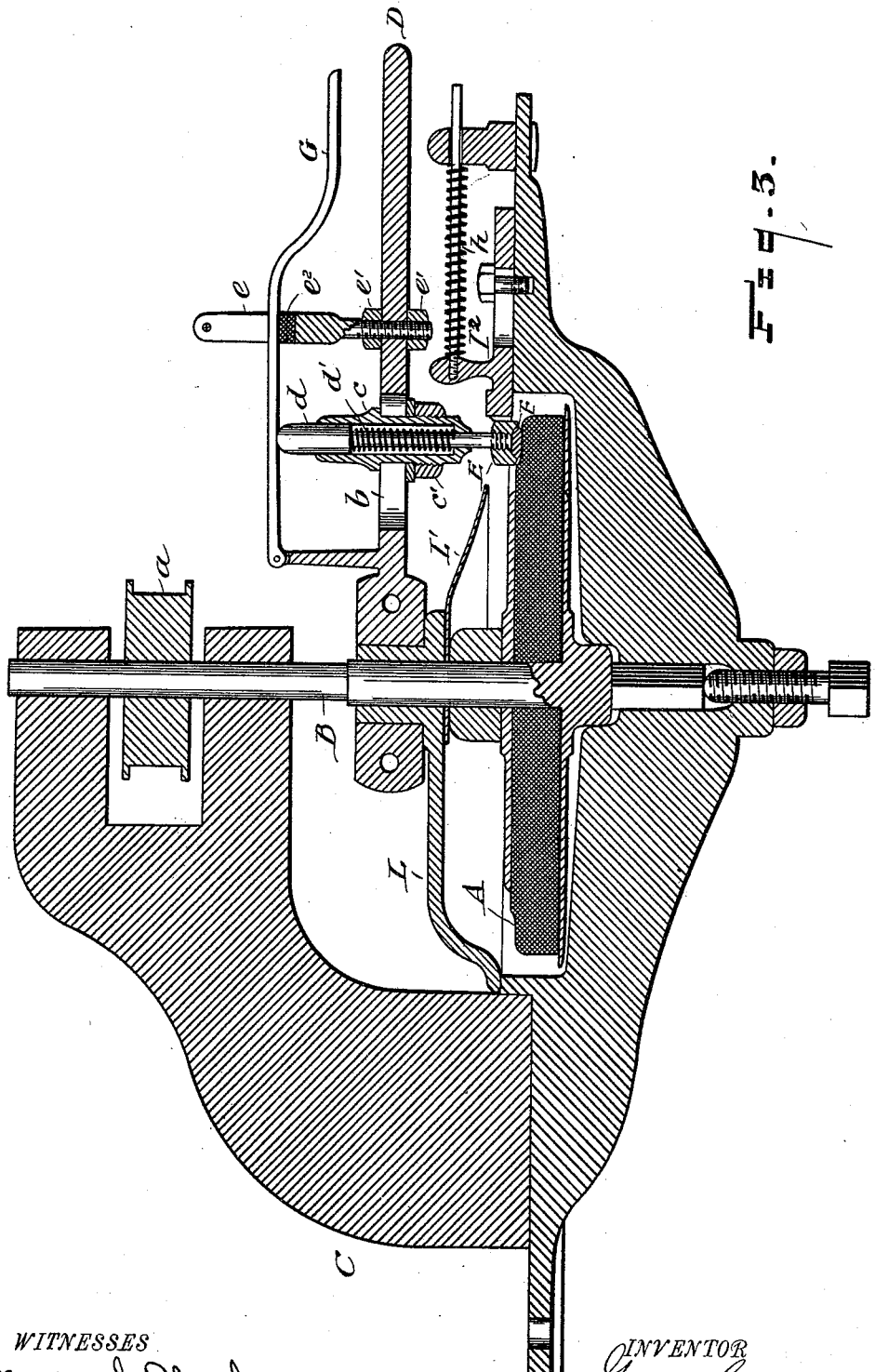
WITNESSES
Norris A. Clark,
N. F. Oberli
INVENTOR
George Carlyle
By Dyer & Seely
Attys.

(No Model.) 4 Sheets—Sheet 4.
G. CARLYLE.
APPARATUS FOR FORMING PEARL BUTTONS.
No. 522,044. Patented June 26, 1894.
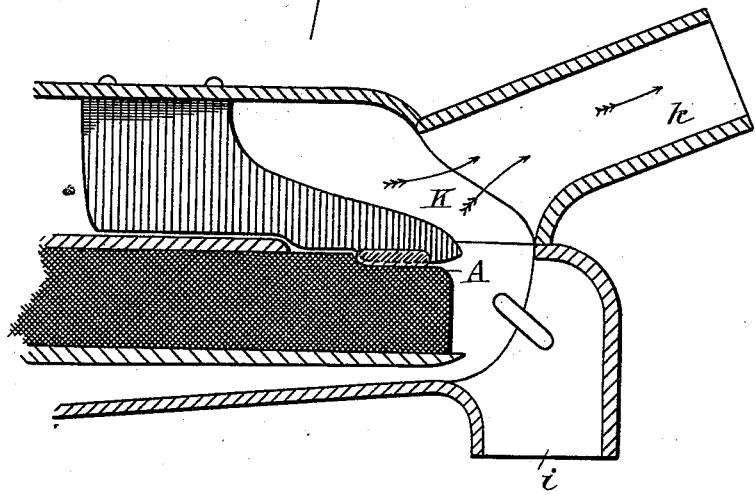
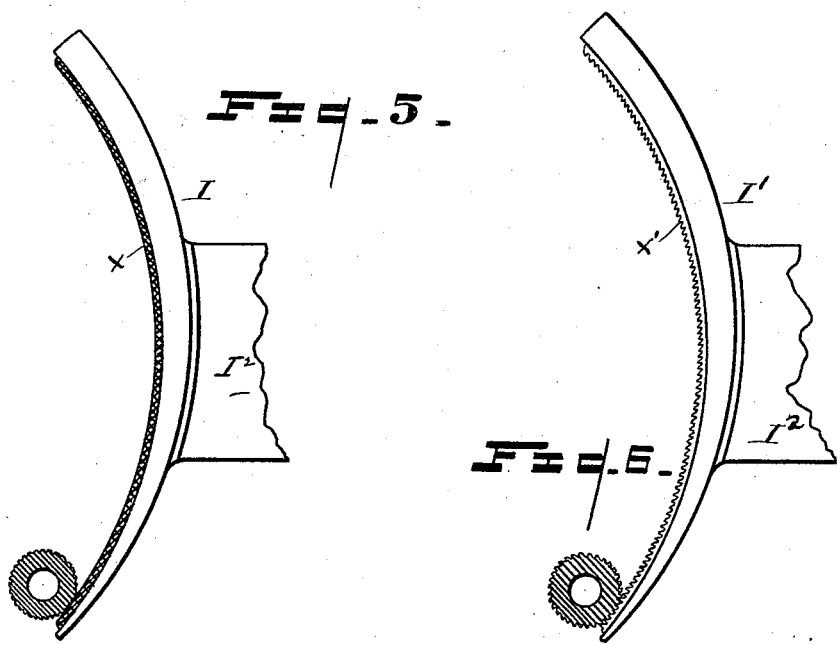
WITNESSES
INVENTOR

UNITED STATES PATENT OFFICE.

GEORGE CARLYLE, OF DETROIT, MICHIGAN, ASSIGNOR TO THE STANDARD PEARL BUTTON COMPANY, LIMITED, OF SAME PLACE.

APPARATUS FOR FORMING PEARL BUTTONS.

SPECIFICATION forming part of Letters Patent No. 522,044, dated June 26, 1894.

Application filed February 10, 1892. Serial No. 421,006. (No model.)

*To all whom it may concern:*

Be it known that I, GEORGE CARLYLE, a citizen of the United States, residing at Detroit, in the county of Wayne and State of Michigan, have invented a certain new and useful Improvement in Apparatus for Forming Pearl Buttons, (Case B,) of which the following is a specification.

As has been made known by my Patent No. 301,801, my machine for forming pearl buttons is provided with a rotating blank-holding chuck and a rotating grinding-wheel, the chuck and grinding-wheel rotating in planes perpendicular to each other and being relatively movable toward and away from each other. By a machine of this character I can grind the faces and backs of pearl buttons and give them any desired concave or convex shape. The backs of pearl buttons, when formed at all, are usually given a simple convex shape, and this shape may also be given to the faces of some of the cheaper grades of buttons. I have found that for the purpose of producing a convex surface upon the backs or faces of pearl buttons, an efficient machine may be constructed in which the grinding-wheel and button-blank are rotated in parallel planes instead of in perpendicular planes.

My present invention relates to a machine of this character.

In the accompanying drawings forming part hereof, Figure 1 is a perspective view of a machine embodying the invention and by the operation of which my method is carried out. Fig. 2 is a top view of the machine. Fig. 3 is a vertical section through the center of the machine. Fig. 4 is a sectional view through the discharge spout of the machine; and Figs. 5 and 6 are views of two devices for producing rotation of the button-blank.

In the drawings, A represents a horizontal grinding-wheel mounted upon a vertical shaft B journaled in a suitable frame C and driven by a pulley $a$. The upper face of the grinding-wheel A at its edge is provided with a suitable shape for giving the convex form desired to the button.

Above the grinding-wheel and adapted to swing around the shaft B is a radial arm D projecting beyond the machine at one side. Secured in a slot $b$ in this arm is a hollow holder $c$ adapted to be adjusted in the slot $b$ to any desired position and held therein by a nut $c'$. Through this hollow holder extends a rod $d$ adapted to rotate freely therein, said rod being thrown upwardly by a spring $d'$ within the holder $c$ and carrying at its lower end an inverted cup E which forms the holder for the button-blank F. The rod $d$ projects through the holder $c$ at its upper end and is depressed by the downward movement of a hand-lever G, which is pivoted at its forward end to a stud rising from the arm D, and projects outwardly parallel with said arm, forming, with the end of the arm, a double handle which can be grasped by the hand of the operator. The lever G passes through a yoke $e$ which is supported by the arm D and is adjustable vertically thereon by means of nuts $e'$. The yoke $e$ has an elastic cushion $e^2$ upon which the lever G is pressed when forced downwardly by the hand. A horizontal table H is supported upon the frame of the machine at one side and beneath the radial arm D, and upon this horizontal table are laid the button-blanks. The table H has a delivery spout $f$, which projects over and just above the grinding-surface of the wheel A. An adjustable gage $g$ is mounted upon the feed-table H, furnishing a guide for delivering the button-blanks to the holder E. A button-blank being placed in the angle of the guide $g$, the arm D is swung to the left by the operator until the blank-holder E is over the blank, when the lever G is depressed by the same hand of the operator, forcing the blank-holder down upon the blank. The operator, grasping with his right-hand the ends of both lever G and arm D, moves those parts to the right, carrying the blank-holder with the blank in it along over the surface of the feed-table, out of the spout $f$ onto the surface of the grinding-wheel. To effectively perform the grinding operation, however, a rotating movement of the blank must be produced. This is accomplished by the following features of construction: The blank-holder E has its periphery toothed or serrated and engages with a curved bar I or I' (Figs. 5 and 6) as it is moved off of the feed-table. The face of bar I has a friction pad $x$ of leather or other suitable material attached to it, and bar I' is shown as having a toothed face $x'$, so that the movement of the blank-holder over the surface of the grinding-wheel also produces a rotation of the blank-holder by reason of its engagement with the face of the curved bar. The bar I is held by a plate $I^2$ sliding in suitable guides on the frame, as shown, and held forward by a spring $h$ so as to produce a spring pressure against the blank-holder. At the limit of movement of the blank-holder to the right, a scraper K is provided which scrapes the button off the surface of the grinding-wheel when released by the blank-holder, permitting the button to fall through a spout $i$. At this point the dust-pipe $k$ is located, which is connected with an exhaust fan for carrying off the dust from the machine. The grinding-wheel is entirely covered over its upper surface, except for that portion over which the button-blank moves, by a shell L, within which is an additional dust-shield L' projecting down close to the operative face of the grinding-wheel. This shell and dust-shield confine the dust produced by the grinding operation to the space beneath the shell and shield, from which space it is drawn by the exhaust pipe.

The operation of the machine is as follows: The grinding-wheel is rotated in the direction of the arrow in Fig. 2, that is, its surface moves from the left to the right of an operator facing the machine in the position in which the operator would stand to work it. The button-blanks being placed in suitable numbers upon the feed-table H, one of them is moved into the angle of the guide $g$, the arm D is moved to the left, and when the blank-holder E is over the button-blank, the lever G is grasped by the hand of the operator and drawn down upon the arm D, forcing the blank-holder down upon the blank; the lever G and arm D being held by the hand of the operator, he moves the swinging arm to the right, the button-blank rubbing over the surface of the feed-table and passing out through the spout $f$ from the feed-table upon the surface of the grinding-wheel. At this moment, as the movement is continued to the right, the serrated periphery of the blank-holder E strikes the teeth or friction pad on the face of the curved bar and the further movement to the right of the button-blank holder causes a rotation of such blank holder and of the blank carried thereby, so that the grinding-wheel will give the convex shape to the button. When the limit of the movement to the right has been reached, the operator releases the lever G, which is thrown upwardly, the blank-holder rises off of the button, which is carried farther to the right by the movement of the grinding-wheel and is scraped off of the grinding-wheel by the scraper K and falls through the spout $i$; the arm D is again swung to the left, the blank-holder is forced down upon a new blank and the operation is repeated. In this way pearl buttons can be provided with convex surfaces on one or both sides, and the operation of grinding will be performed expeditiously and cheaply. The horizontal feed-table and the manner of grasping the blanks by the blank-holder and moving them horizontally across such table upon the grinding-wheel add materially to the quickness of the operation.

What I claim is—

1. In a button forming machine, the combination with a grinding wheel having a shaped grinding surface around the edge of one side of the wheel, of a swinging blank holder for moving the blank in a plane parallel with the grinding-wheel, and means for rotating the blank holder, substantially as set forth.

2. In a button making machine, the combination with a grinding wheel having a shaped grinding surface around the edge of one side of the wheel, of a blank holder, a laterally swinging arm carrying said holder, adapted to move the blank in a plane parallel with the grinding wheel, and a curved bar against which said blank holder impinges through which said holder is rotated when moved laterally by the swinging arm, substantially as set forth.

3. In a button making machine, the combination with a grinding wheel having a shaped grinding surface around the edge of one side of the wheel, a laterally swinging arm, a vertically moving blank holder carried by said arm, and means carried by said arm for moving said blank holder to grasp a blank and for retaining such blank in contact with the grinding wheel, substantially as set forth.

4. In a button making machine, the combination with a grinding wheel having a shaped grinding surface around the edge of one side of the wheel, a laterally swinging arm, a vertically moving blank holder carried by said arm, means carried by said arm for moving said blank holder to grasp a blank and for retaining such blank in contact with the grinding surface, and a curved bar against which said blank holder impinges through which said holder is rotated in the swinging arm when moved laterally thereby, substantially as set forth.

5. In a pearl button forming machine, the combination with a horizontal grinding-wheel, of a horizontal feed-table, a vertical blank-holder having a swinging movement over such feed-table and adapted to be depressed upon a blank upon such table and to move the blank while held horizontally off of the feed-table and upon the grinding-wheel, substantially as set forth.

6. In a pearl button forming machine, the combination with a horizontal rotating grinding-wheel and swinging blank-holder, of the scraper for removing the buttons from the wheel, substantially as set forth.

7. In a pearl button forming machine, the combination with the rotating grinding-wheel, of the feed-table, the swinging arm carrying the vertically moving blank-holder, the lever for depressing such blank-holder, and the curved bar for rotating the blank-holder, substantially as set forth.

8. In a button forming machine, the combination with a grinding wheel, a blank holder, a swinging arm for moving the blank in a plane parallel with the grinding wheel, and an adjustable bar against which said blank holder impinges through which said holder is rotated when moved by the swinging arm, substantially as set forth.

This specification signed and witnessed this 2d day of February, 1892.

GEORGE CARLYLE.

Witnesses:
JOHN H. POWELL,
GEORGE MAITLAND.